US006067479A

United States Patent [19]

Hieb

[11] Patent Number: 6,067,479

[45] Date of Patent: May 23, 2000

[54] FM TRANSLATOR UNOBTRUSIVE AUDIO SEGMENT INSERTION SYSTEM

[76] Inventor: Mario K. Hieb, 36 H St. #3, Salt Lake City, Utah 84103

[21] Appl. No.: 08/977,310

[22] Filed: Nov. 24, 1997

Related U.S. Application Data

[60] Provisional application No. 60/031,470, Nov. 25, 1996.

[51] Int. Cl.[7] ........ H04B 7/00

[52] U.S. Cl. ........ 700/94; 455/4.1

[58] Field of Search ........ 348/9; 455/4.2, 455/18, 17, 7, 4.1; 700/94

[56] References Cited

U.S. PATENT DOCUMENTS

| | | | |
|---|---|---|---|
| 4,694,490 | 9/1987 | Harvey et al. | 380/20 |
| 5,029,014 | 7/1991 | Lindstrom | 358/342 |
| 5,155,591 | 10/1992 | Wachob | 358/86 |
| 5,600,366 | 2/1997 | Shulman | 348/9 |

OTHER PUBLICATIONS

*Radio World*, vol. 19, No. 7, Apr. 5, 1995.
*Radio World*, vol. 19, No. 10, May 17, 1995.

*Primary Examiner*—Vivian Chang
*Assistant Examiner*—Brian Tyrone Pendleton
*Attorney, Agent, or Firm*—Madson & Metcalf

[57] ABSTRACT

An audio segment insertion system is used in conjunction with a FM transmission chain and translator for unobtrusive insertion of audio segments into a translator broadcast. An encoder inserts an unobtrusive insertion signal into a primary broadcast produced by the transmission chain to correspond with a spot break in the primary broadcast. A tone decoder is connected to the translator for receiving the primary broadcast and detecting the insertion signal. A computer is connected to the tone decoder to thereby allow the tone decoder to transmit the insertion signal to the computer to signal audio segment insertion. The computer establishes an insert window time interval based on real time information during which audio segment insertion is permitted. Upon the computer receiving the insertion signal during the insert window the computer effects insertion of a selected audio segment into the translator broadcast.

20 Claims, 4 Drawing Sheets

FM TRANSLATOR UNOBTRUSIVE AUDIO SEGMENT INSERTION SYSTEM

RELATED APPLICATIONS

This application claims the benefit of U.S. Provisional application Ser. No. 60/031,470 filed Nov. 25, 1996.

BACKGROUND

1. The Field of the Invention

The invention relates to a system for inserting audio segments within an FM translator broadcast transmission. More specifically, the invention is directed towards a system for automatically and unobtrusively inserting audio segments within a FM translator broadcast transmission.

2. The Background Art

FM translators are stations that receive the signals of an FM broadcast from a primary radio station and simultaneously retransmit these signals on another frequency. Translators are usually located at remote locations as a means of providing FM service to areas which are unable to receive satisfactory FM signals due to distance and intervening terrain obstructions. The translator may receive the broadcast from the primary radio station over the air. Alternatively in some circumstances, the translator may receive broadcasts from the primary radio station across land lines or a combination of air and land lines.

Inserting audio segments into the translator broadcast is desired for a variety of reasons including the airing of commercial announcements or fund raising messages in the local areas serviced by the translators. Conventional methods simply insert the audio segments automatically into the translator broadcast during periodic intervals. Alternatively, the audio segment insertions may be randomly inserted into the primary broadcast. In either situation, such insertions are not synchronized with normal spot breaks in the primary broadcast and result in highly obtrusive interruptions of the original programming. Such interruptions reduce the quality of the program continuity of the original programming.

From the foregoing it will be appreciated that it would be an advancement in the art to provide a means for unobtrusively inserting audio segments into a translator broadcast. It would be a further advancement in the art to provide a means for inserting audio segments into a translator broadcast which is synchronized with the spot breaks in the primary broadcast. It would also be an advancement in the art to provide an automatic means for unobtrusively inserting audio segments into a translator broadcast. Such a device is disclosed herein.

BRIEF SUMMARY

The invention provides unobtrusive and automatic audio segment insertion into a primary broadcast received and transmitted by a translator. At the primary broadcast station the original program is mixed with an insertion signal. The insertion signal is preferably sub-sonic so that it does not interfere with the audio quality or program continuity of the programming. The insertion signal is mixed in the original program at an appropriate spot break and cues the translator as to insertion of audio segments in the original program.

At the translator site, the primary broadcast is passed through a tone decoder where the insertion signal is detected and passed through a control interface to a translator computer. The computer establishes an insert window time interval during which audio segment insertion is enabled. Reception of the insertion signal during an the insert window will cause the translator computer to commence audio segment insertion. Audio segment insertion causes the translator computer to interrupt the translator broadcast and retrieve an appropriate audio segment file stored in the computer's hard drive. Interruption of the translator broadcast generally corresponds to a spot break in the translator broadcast. The translator computer transmits the audio segment through an audio playback device and ultimately through the translator's transmit antenna. Updated audio segment files may be transmitted to the translator computer across conventional communication means thereby reducing the frequency of operator visits to the translator sites.

Thus, it is an object of the invention to provide unobtrusive cueing of audio segment insertions.

It is a further object of the invention to provide unobtrusive audio segment insertion by synchronizing the insertion with an existing established spot break in the original broadcast.

It is an additional object of the invention to provide automatic audio segment insertions and remote access updates of the audio segment files.

These advantages of the present invention will become more fully apparent by examination of the following description of the preferred embodiments and the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF TE PREFERRED EMBODIMENTS

Figure 1A:
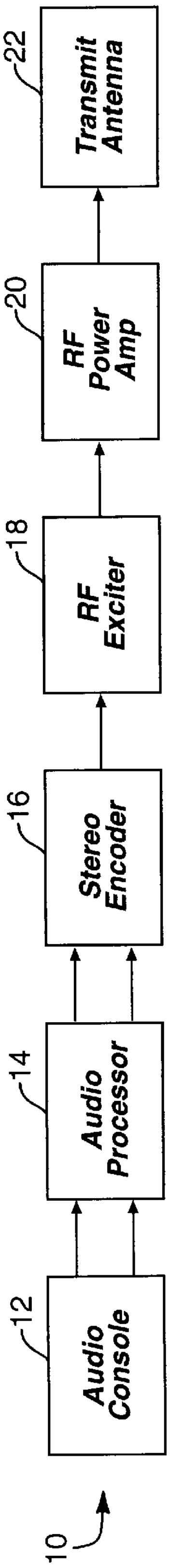
FIG. 1A is a block diagram illustrating a conventional FM transmission chain.

Reference is now made to the embodiments and methods illustrated in FIGS. 1 through 6. With reference to FIG. 1A there is generally shown a block diagram of a conventional FM transmission chain 10. The FM transmission chain 10 comprises an audio console 12, an audio processor 14, a stereo encoder 16, a RF exciter 18, a RF power amplifier 20, and a transmit antenna 22. These components are in electrical communication with another to sequentially process and transmit audio signals. The FM transmission chain 10 serves to transmit a broadcast program from a primary station.

Figure 1B:
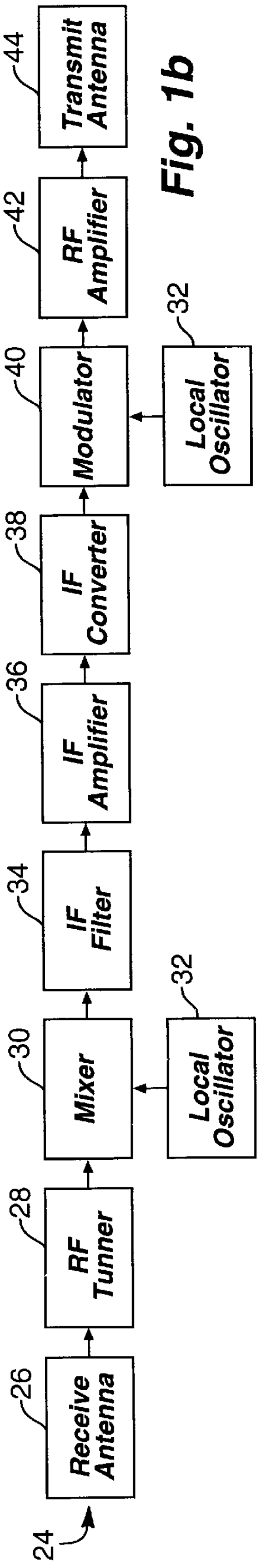
FIG. 1B is a block diagram illustrating a conventional translator.

With reference to FIG. 1B, a block diagram of a conventional translator is generally indicated at 24. The translator comprises a receive antenna 26, a RF tuner 28, a mixer 30, local oscillators 32, an IF filter 34, an IF amplifier 36, an IF converter 38, a modulator 40, RF amplifier 42, and a transmit antenna 44. These components are in electrical communication with one another to process received transmissions as shown at a site remote to the primary station. All components represented in FIGS. 1A and 1B are well known in the art and have various embodiments in the industry.

Figure 2A:
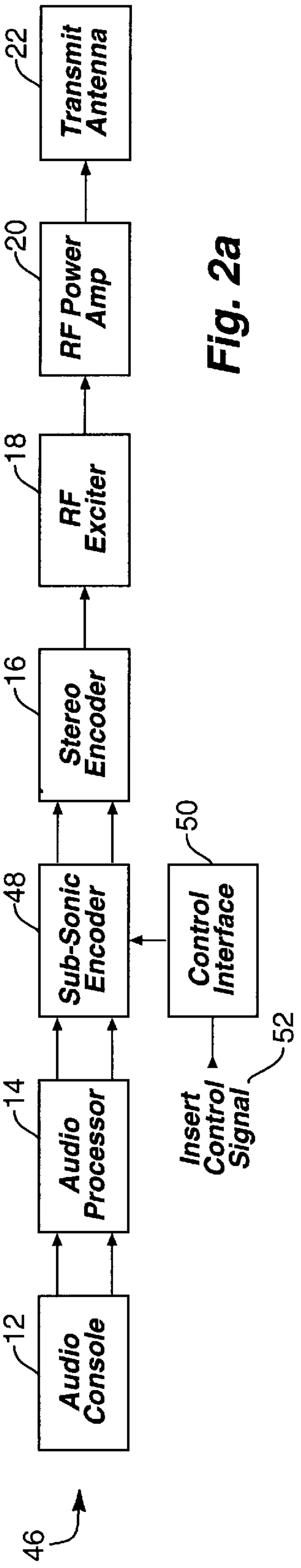
FIG. 2A is a block diagram illustrating the components of the invention relating to the FM transmission chain.

With reference to FIG. 2A a block diagram representing one presently preferred embodiment of the FM transmission chain of the invention is generally designated 46. The invention incorporates additional components which act in conjunction with the conventional components represented in FIG. 1A. The FM transmission chain 46 comprises a sub-sonic encoder 48 in electrical communication with the audio processor 14 and the stereo encoder 16. In alternative embodiments the sub-sonic encoder 48 may be placed in electrical communication between the audio console 12 and the audio processor 14 or at other locations in the audio transmission chain. As the primary broadcast is processed by the FM transmission chain 46, the sub-sonic encoder 48 is used to mix an insertion signal into the primary broadcast. In one presently preferred embodiment, as is generally described herein, the insertion signal is a sub-sonic signal. A sub-sonic signal has the advantage of not detracting from the continuity and audio quality of the program. Nevertheless, one of skill in the art will appreciate that other insertion signals are possible and are included within the scope of the invention.

The FM transmission chain 46 further comprises a control interface 50 which is in electrical communication with the sub-sonic encoder 48 and instructs the sub-sonic encoder 48 when to mix the sub-sonic signal. The control interface 50 controls the mixing of the sub-sonic signal based on an inputted insert control signal 52. The input control signal 52 may be generated by a switch closure which is performed at predetermined intervals. The switch closure may be performed manually by an operator by means of a start switch. Alternatively, the switch closure may be performed automatically by a general purpose interface. In practice, the insert control signal 52 would be sent at the beginning of a commercial spot break in the original broadcast to cue the insertion of an audio segment at the translator site.

Figure 3:
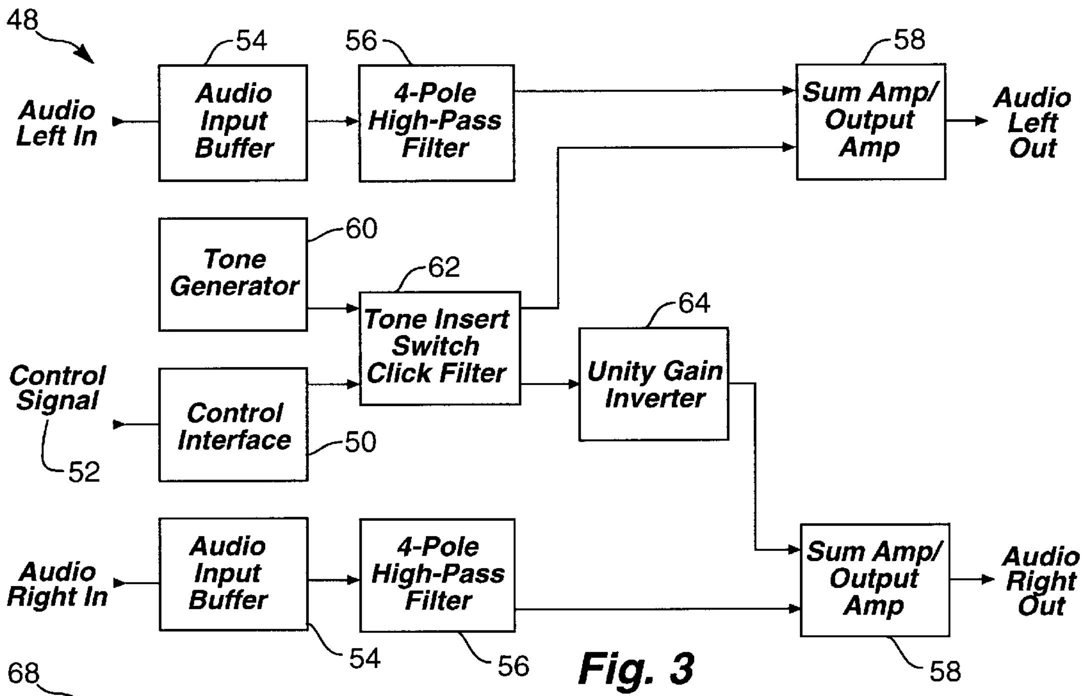
FIG. 3 is a block diagram representing the encoder and the control interface.

With reference to FIG. 3, a block diagram of one presently preferred embodiment of the sub-sonic encoder 48 is shown. The elements of the sub-sonic encoder 48 include an audio input buffer 54, a high pass filter 56, and a summing/output amplifier 58 for both the left and right audio channels respectively. The first stage for both left and right audio lines is the input buffer 54 which optimizes the interface of the sub-sonic encoder 48 in the audio chain. Next the audio is fed into the high pass filter 56 to filter the primary broadcast. In one presently preferred embodiment, the high pass filter 56 is comprised of a 4 pole high pass Butterworth filter. The desired roll-off frequency is 40 Hz but may vary. One of skill in the art will appreciate that a variety of equivalent components may be used for the high pass filter 56 and are included within the scope of the invention.

The sub-sonic encoder 48 further comprises a tone generator 60 to produce the sub-sonic signal to be mixed into the primary broadcast. In one presently preferred embodiment, the tone generator generates a sine wave which is preferably about 20 Hz. The 20 Hz sine wave is within a range of frequency that will be used as an unobtrusive method of audio segment insertion cueing. As mentioned previously, alternative methods utilizing other signals within the 0 Hz to 100 kHz range are also possible. The alternative methods include the use of DTMF tones, 14.5 Khz tones, pilot modulation, SCA signals, program phase switching, data bursts, pilot phase modulation, use of subcarriers such as RBDS, and other methods of tone insertions. These alternative methods use signals which are within the 0 Hz to 100 kHz range of the composite signal but outside of the left and right audio bandwidths. One of skill in the art will appreciate that a number of these alternative methods are not as practical or as unobtrusive as sub-sonic signals.

The tone generator 60 is in electrical communication with a tone insert switch 62 to thereby transmit the sub-sonic signal to the tone insert switch 62. The tone insert switch 62 is also in electrical communication with the control interface 50 and summing/output amplifiers 58 for both the left and right audio lines. The tone insert switch 62 remains open until it receives a signal from the control interface 50 to close 62. Upon closure, the tone insert switch 62 passes the sub-sonic signal to the summing/output amplifiers 58. The tone insert switch 62 preferably further comprises a click filter to reduce noise in the sub-sonic signal created by operation of the tone insert switch 62.

As shown in FIG. 3, the sub-sonic signal passes directly from the tone insert switch 62 to the summing/output amplifier of the left audio line 58. The left summing/output amplifier 58 mixes the filtered audio program with the 20 Hz sub-sonic signal. The sub-sonic signal also passes from the tone insert switch 62 to a unity gain inverter 64 to invert the sub-sonic signal for the right audio line. The inverted sub-sonic signal is then transmitted to the right summing/output amplifier 58 of the right audio line. The right summing/output amplifier 58 mixes the filtered audio program with the inverted 20 Hz sub-sonic signal. Inverting the sub-sonic signal is a feature that is not necessary for the purposes of the invention but improves detection of the sub-sonic signal as is explained in greater detail below. In viewing the Left minus Right audio lines in the frequency domain, the 20 Hz sub-sonic signal appears as a 37,980 Hz signal and as a 38,020 Hz signal because the Left minus Right portion of the composite centers about 38 Khz. The left and right summing/output amplifiers 58 further provide a low impedance output. The mixed audio program proceeds through the audio chain and is transmitted.

The sub-sonic encoder 48 may be alternatively embodied as a digital signal processor (DSP) rather than analog components. The DSP is programmed to accept an analog audio signal and convert the analog signal to a digital signal. The DSP is further programmed to perform all of the functions of the sub-sonic encoder including filtering and mixing of the sub-sonic signal as described above.

In an alternative embodiment, additional encoders may be placed in the transmission audio chain to mix additional signals with the primary signal. An additional encoded signal could allow for sending optional commands to the translator for future incorporated features.

Figure 2B:
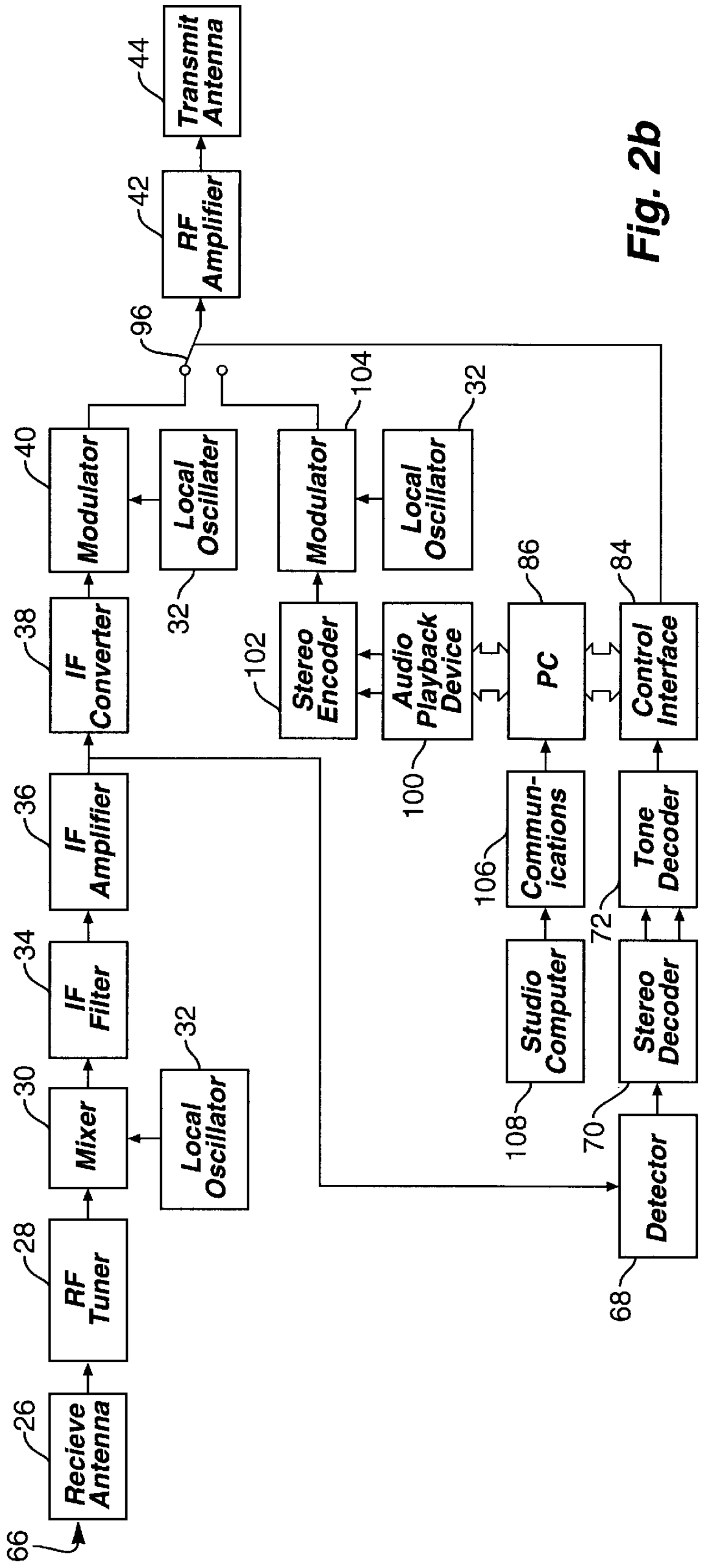
FIG. 2B is a block diagram illustrating the components of the invention relating to the conventional translator.

With reference to FIG. 2B, a translator of the present invention is generally shown with components of a conventional translator. One of skill in the art will appreciate that various translators may be modified or retrofitted to incorporate the components of the invention. The mixed primary broadcast is received by the receive antenna 26 of the translator 66 and is processed for transmission at a different frequency. At some point in the chain of translator components the mixed primary broadcast is transmitted to an FM to audio detector 68 to detect the presence of the sub-sonic signal. In one presently preferred embodiment this is done between the IF amplifier 36 and the IF converter 38 as shown in FIG. 2B. One of skill in the art will appreciate that the mixed primary broadcast may also be diverted at other locations in the audio chain.

The FM to audio detector 68 converts the sub-sonic signal to audio and passes the signal to a stereo decoder 70. The stereo decoder 70 decodes the mixed primary broadcast into discrete left and right audio. The left audio contains a sub-sonic signal and the right audio contains an identical sub-sonic signal which is 180 degrees out of phase. The left and right audio are then passed to the tone decoder 72.

Figure 4:
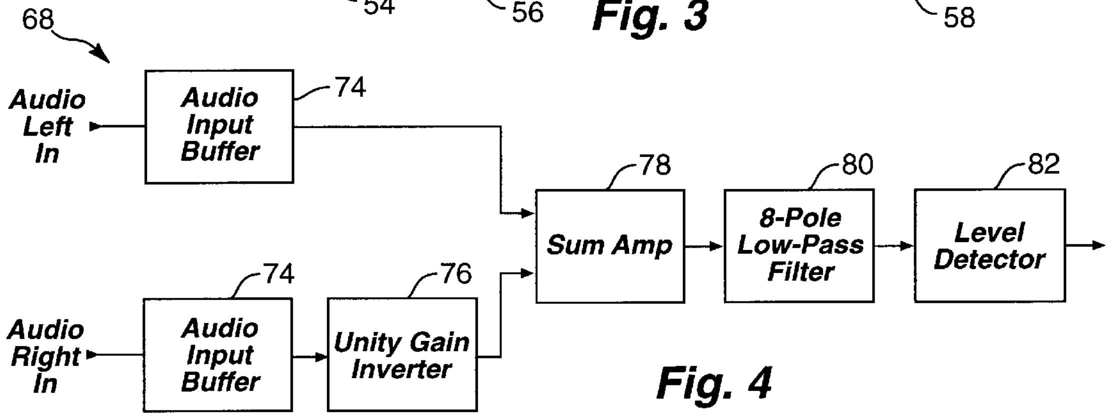
FIG. 4 is a block diagram representing the tone decoder.

The tone decoder 72 may take a number of different embodiments including analog circuitry, digital circuitry, or software code in combination with hardware for detecting the sub-sonic signal. With reference to FIG. 4, a block diagram of a tone decoder 72 of one presently preferred embodiment is shown. The left and right audio are first passed through audio input buffers 74 which optimize interfacing in the audio chain. The right audio then passes through a unity gain inverter 76 to invert the signal of the right audio.

The left audio and the inverted right audio are summed together in a summing amplifier 78. The summation of the left and inverted right audio signals results in a canceling of a large portion of the program audio. The summation also results in a doubling in amplitude of the sub-sonic signal which provides for easier detection. The output of the summing amplifier 78 is passed through a low pass filter 80. Ideally, the low pass filter 80 filters out audio above the 40 Hz range to thereby facilitate detection of the 20 Hz sub-sonic signal. Various filters are suitable for use in the invention but an 8 pole filter has the advantage of a sharper cutoff. In an alternative embodiment, the low pass filter 80 may be placed prior to the summing amplifier 78 on both the left and right audio lines. After passing through the low pass filter 80, the sub-sonic signal is passed to a level detector 82.

The level detector 82 detects the sub-sonic signal and provides the digital interface with the computer control interface 84. In one presently preferred embodiment, the level detector 82 comprises a comparator which compares the amplitude of the received sub-sonic signal to a predetermined level. By doubling the amplitude of the sub-sonic signal and substantially eliminating residual audio, detection of the sub-sonic signal is far easier. After detection, the comparator converts the analog audio signal to a TTL signal. In another alternative embodiment, the level detector 82 comprises a DSP which is programmed to accept an analog audio signal, measure the level of amplitude, and convert the analog signal to a digital signal. In such an embodiment, the DSP may also be programmed to perform the functions of the filters 80, summing amplifier 78, the unity gain inverter 76, and the audio input buffers 74, thereby eliminating need for those components. In yet another alternative embodiment, the primary broadcast is passed through an audio input buffer without encoding the broadcast into discrete left and right audio lines. The primary broadcast is then transmitted to a conventional 567 chip which acts as a tone decoder to detect the sub-sonic signal when the sub-sonic signal is modulated to 37,980 or 38,020 Hz. In all of the various embodiments, a digital signal is outputted to the translator control interface which is indicative of the presence of the sub-sonic signal. The methods of detecting the sub-sonic signal vary considerably and one of skill in the art will appreciate that a number of different methods are possible without departing from the scope of the invention.

With reference again to FIG. 2B, the tone decoder 72 is shown in electrical communication with a computer control interface 84. The computer control interface 84 is in electrical communication with a translator computer 86 to thereby provide the interfacing with the translator computer 86. The translator computer 86 may be a conventional personal computer with sufficient memory and processing capability to perform the functions described below and comprises at a minimum: a central processor, ROM, RAM, and a non-volatile memory (hard drive). The translator computer 86 is programmed with control software code to allow performance of its translator specific tasks. Compressed audio segment files for playback are stored in a memory accessible by the translator computer. In one presently preferred embodiment, the audio segment files are stored on the hard drive of the translator computer 86.

Figure 5:
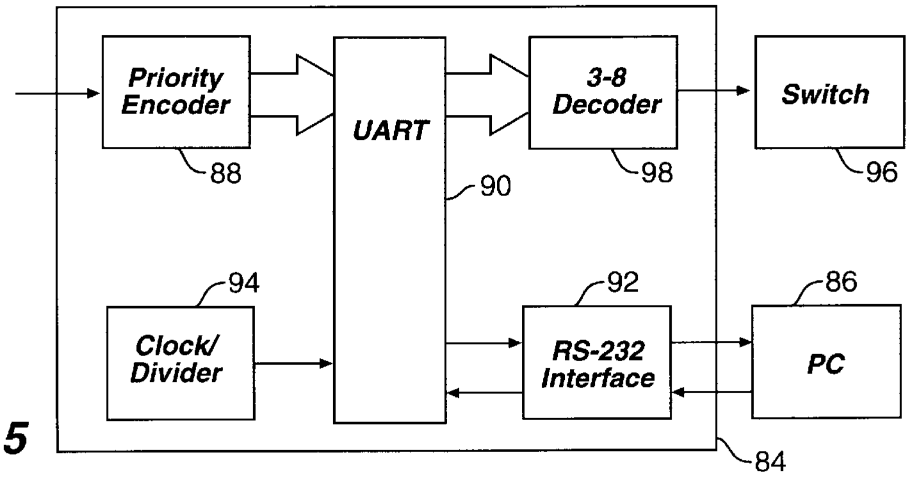
FIG. 5 is a block diagram representing the computer control interface.
Figure 6:
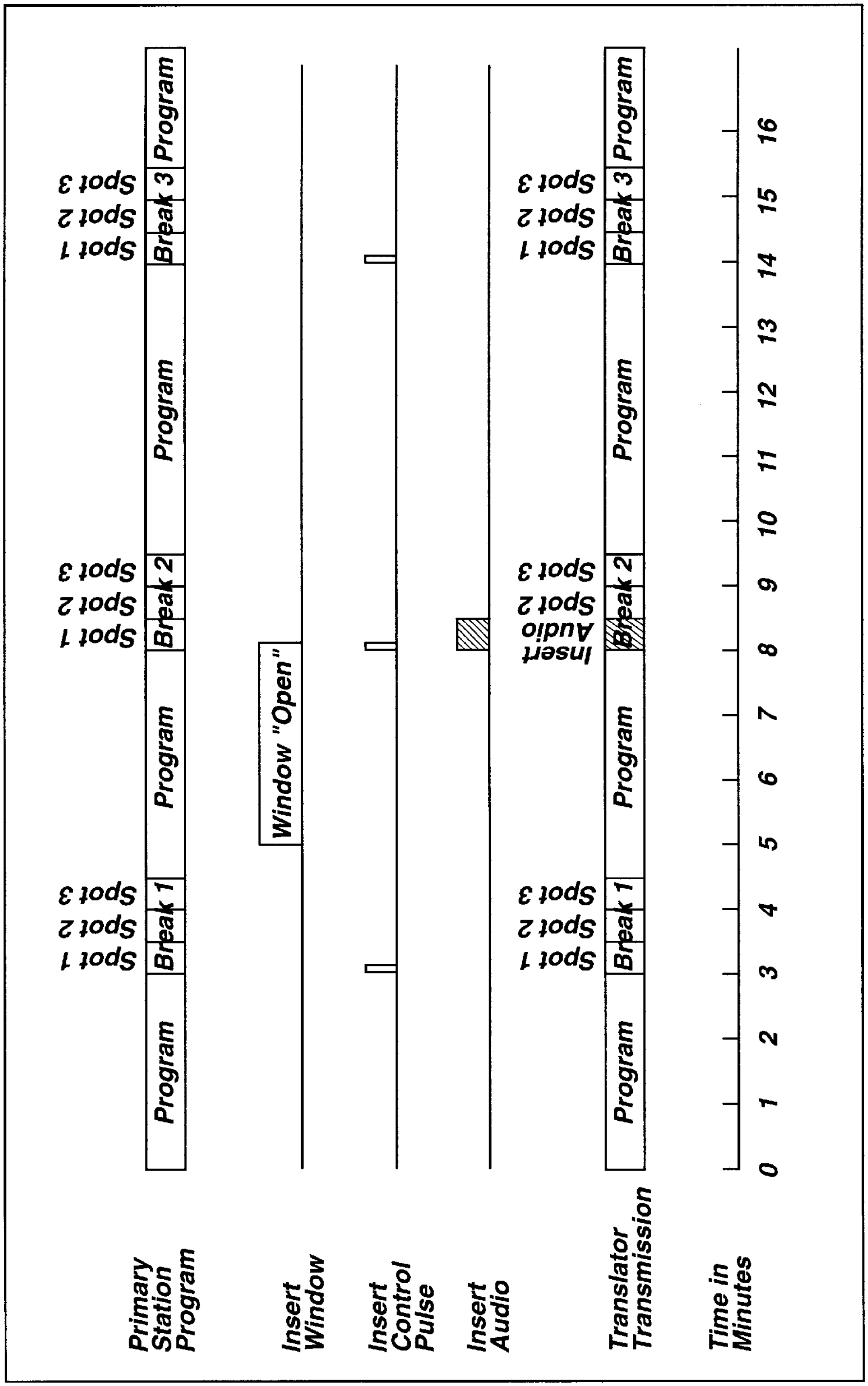
FIG. 6 is a timing diagram illustrating synchronization of audio segment insertions.

With reference to FIG. 5, a block diagram illustrating one presently preferred embodiment of the control interface 84 is shown. The control interface comprises a priority encoder 88 and a universal asynchronous receive transmit (UART) chip 90 which are in electrical communication with one another. The priority encoder 88 is also in electrical communication with the tone decoder 72 to receive the digital TLL signal. The priority encoder 88 provides the interfacing between the tone decoder 72 and the UART 90 and converts the received digital TTL signal into a final digital output code.

The UART 90 provides all of the necessary interface functions so that the microprocessor of the translator computer 86 can interface with the serial devices of the invention. The UART 90 is in serial electrical communication with the translator computer 86 by a conventional RS-232 interface 92. The computer control interface 84 further comprises a clock/divider 94 in electrical communication with the UART 90 in order to enable operation of the UART 90. The UART 90 receives the digital signal and passes this to the translator computer 86. The UART 90 further receives and transmits commands from the translator computer 86 regarding the position of a switch 96. The switch is in electrical communication with the UART 90 through a 3 to 8 decoder 98.

With reference again to FIG. 2B, the switch 96 is indicated which normally remains in a play position to enable transmission of the primary broadcast by the translator. The primary broadcast also includes the sub-sonic signal which does not interfere with the program continuity. The switch 96 is shown between the modulator 40 and the RF amplifier 42 in the audio chain although other locations may also be used.

When the translator computer 86 receives the sub-sonic signal the translator computer 86 determines if this is during the time interval of an insert window. The timing of the insert window is established by the control program in the translator computer 86 and is described in more detail below. If the sub-sonic signal is not received during the insert window then the translator computer 86 ignores the signal. If the sub-sonic signal is received during the interval window, then the translator computer 86 proceeds with an audio segment insertion sequence.

The audio segment insertion sequence begins with the translator computer 86 retrieving the appropriate audio segment file from its hard drive. Selection of the audio segment file is based on an input log file stored on the hard drive. In alternative embodiment, the audio segment files may be stored on other memory storage locations. The translator computer 86 sends a command to the computer control interface 84 to toggle the switch 96 to enable transmission of the audio segment and interrupt the translator's previous broadcast of the primary broadcast. The translator computer 86 then transmits the audio segment to an audio playback device 100. The audio playback device 100 may be any number of various audio devices capable of playing retrieved audio segment files. In the preferred embodiment, the audio playback device 100 would be a digital audio card in the translator computer 86 which performs a digital to analog conversion of the audio segment file. The audio playback device 100 transmits the analog audio segment through the audio chain comprised of a stereo encoder 102, a modulator 104, the switch 96, the RF amplifier 42, and the transmit antenna 44.

After transmission, the translator computer 86 updates a performance log maintained on its hard drive to reflect which audio segment files have been played. After a specified time interval lapses, which represents the duration of the audio segment, the translator computer 86 toggles the switch back to its normal play position. Other functions performed by the translator computer 86 include monitoring the system parameters and performing other general internal housekeeping tasks.

In one presently preferred embodiment, the translator computer 86 communicates through a communication link 106 to a studio computer 108. The communication link 106 is represented by the communications block shown in FIG. 2. In one embodiment the communication link 106 may comprise high speed modems and direct land lines such as a telephone line. However, because translators are often located at remote sites, other embodiments for the communications link 106 include air delivery such as microwave, FM broadcasts, spread spectrum transceivers, and the like. In yet another embodiment, the communications link 106 may be a hybrid of direct link and air delivery.

The translator computer 86 and the studio computer 108 exchange audio segment files, log information, and other data. The studio computer 108 records and edits audio segment files, compresses the files, and then transmits the updated compressed audio segment files to the translator computer 86. The studio computer 108 also creates input log files and transmits them to the translator computer 86. The input log files provide the translator computer 86 with information as to which audio segment files are to be played for any given insertion. The studio computer 106 receives the performance logs from the translator computer 86 which reflect which audio segment files have been played. Further information which may be transmitted from the studio computer 108 includes updates to the control program of the translator computer 86. The communications link 106 can provide updates to the translator computer 86 without an operator visit to the site. This is advantageous in that translator sites are in remote locations and frequent changing of audio segment files may be involved. Accordingly, routine maintenance visits will only be required during operation of the invention.

With reference to FIG. 7, a timing diagram is shown which illustrates synchronized operation of the invention. In contrast to conventional methods, the invention synchronizes the audio segment insertion with the primary broadcast so as to interrupt the primary broadcast during established spot breaks. The primary station program timeline represents the primary broadcast or program and commercial spot breaks as shown. The control program on the translator computer 86 creates an insert window from a database based on real time information. The real time information may be derived from the programming clock of the primary station to thereby ensure correspondence of the control program with the primary station. The translator computer 86 is programmed to only allow audio segment insertion during the insert window. Sub-sonic signals received outside of the insert window would not result in audio segment insertion. This feature is designed to eliminate faulty audio segment insertions.

By way of example, the first spot break usually occurs at 20 minutes past the top of the hour. For insertion purposes, the insert window would open at about 19 minutes past the top of the hour, or whatever time would best coincide with the beginning of the spot break. Closure of the insert window would also be programmed in the database. Insert window closure could be initiated by the triggering of an audio segment insertion or by the passage of a predetermined amount of time.

The insert control pulse timeline represents reception of the sub-sonic signal. As shown by the insert audio timeline, receipt of the sub-sonic signal during the insert window would cause the translator computer 86 to retrieve and transmit the audio segment. The translator transmission timeline shows the resulting transmission with an inserted audio segment in place of the first spot break. In this manner, an audio segment may be inserted during commercial spot breaks of the primary broadcasts. Accordingly, commercials and not the program material would be preempted by the inserted audio segments. The listener would not be subject to interruption of the original program or annoying forms of cueing for spot breaks.

In alternative embodiments, the invention provides audio segment insertion at the studio location with subsequent transmission to the translator via air transmission such as microwave, spread spectrum transceivers or direct delivery through land lines. This would allow for a simpler device because sub-sonic tones for insertion cueing would not be required. The hardware interface which enables switching between the primary audio and the insert audio would remain the same. Furthermore, the software which determines the opening of the time window would remain the same.

As used herein components in electrical communication do not necessarily mean that they are directly connected to one another. Components in electrical communication are able to transmit electrical signals to one another and may have additional components disposed between them. Thus, the translator computer 86 is in electrical communication with the tone decoder 72 even though the two components must transmit electrical signals through the control interface 84.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention.

What is claimed is:

1. An audio segment insertion system to be used in conjunction with an FM transmission chain and translator for insertion of audio segments into a translator broadcast, comprising:

an encoder in electrical communication with the FM transmission chain for inserting an insertion signal into a primary broadcast;

a tone decoder in electrical communication with the translator for receiving the primary broadcast and detecting the insertion signal; and a computer in electrical communication with the tone decoder and having a control program, wherein the control program establishes an insert window, and wherein upon receiving the insertion signal during an insert window the control program effects insertion of an audio segment into the translator broadcast.

2. The audio segment insertion system of claim 1 wherein the insertion signal comprises a sub-sonic signal.

3. The audio segment insertion system of claim 1 further comprising an encoder control interface in electrical communication with the encoder, wherein the control interface dictates when the encoder inserts the insertion signal into the primary broadcast.

4. The audio segment insertion system of claim 1 wherein the FM transmission chain has a left audio line and a right audio line, and wherein the encoder inserts the insertion signal into the left audio line and the right audio line.

5. The audio segment insertion system of claim 1 wherein the FM transmission chain has first and second audio lines, and wherein the encoder inserts the insertion signal into the first audio line, and wherein the encoder inverts the insertion signal and inserts the inverted insertion signal into the second audio line, and wherein the tone decoder has first and second audio lines, and wherein the tone decoder inverts the second audio line and sums the first audio line and inverted second audio line to facilitate detection of the insertion signal.

6. The audio segment insertion system of claim 1 further comprising a communication link in electrical communication with the computer to enable communication between the computer and a studio computer, wherein the studio computer is able to access and update data in the computer.

7. The audio segment insertion system of claim 1 further comprising a memory in electrical communication with the computer, wherein the audio segments are stored on the memory and wherein the computer accesses the memory and retrieves an audio segment for insertion in the translator broadcast.

8. The audio segment insertion system of claim 7 further comprising an input log file and a performance log file stored on the memory, wherein the computer accesses the input log file to determine selection of the appropriate audio segment, and wherein the computer accesses and updates the performance log file to reflect play of the audio segment.

9. The audio segment insertion system of claim 1 further comprising a switch in electrical communication with the computer, wherein the computer effects control of the switch to interrupt the translator broadcast and insert an audio segment.

10. An audio segment insertion system to be used in conjunction with a FM transmission chain and translator for unobtrusive insertion of audio segments into a translator broadcast from the translator, comprising:

a sub-sonic encoder in electrical communication with the FM transmission chain for inserting a sub-sonic signal into a primary broadcast to correspond with a spot break in the primary broadcast;

a tone decoder in electrical communication with the translator for receiving the primary broadcast and detecting the sub-sonic signal;

a computer control interface in electrical communication with the tone decoder; and a computer in electrical communication with the computer control interface and the tone decoder and having a control program, wherein the tone decoder transmits an insertion signal indicative of the sub-sonic signal to the computer control interface, and wherein the computer control interface transmits the insertion signal to the computer, and wherein the control program establishes an insert window based on real time information, and wherein upon the computer receiving the insertion signal during an insert window the control program effects insertion of an audio segment into the translator broadcast.

11. The audio segment insertion system of claim 10 further comprising an encoder control interface in electrical communication with the encoder, wherein the control interface dictates when the encoder inserts the sub-sonic signal into the primary broadcast.

12. The audio segment insertion system of claim 10 wherein the FM transmission chain has first and second audio lines, and wherein the encoder inserts the insertion signal into the first audio line, and wherein the encoder inverts the insertion signal and inserts the inverted insertion signal into the second audio line, and wherein the tone decoder has first and second audio lines, and wherein the tone decoder inverts the second audio line and sums the first audio line and inverted second audio line to facilitate detection of the insertion signal.

13. The audio segment insertion system of claim 10 further comprising a communication link in electrical communication with the computer to enable communication between the computer and a studio computer, wherein the studio computer is able to access and update data in the computer.

14. The audio segment insertion system of claim 10 further comprising a memory in electrical communication with the computer, wherein the audio segments are stored on the memory and wherein the computer accesses the memory and retrieves an audio segment for insertion in the translator broadcast.

15. The audio segment insertion system of claim 14 further comprising an input log file and a performance log file stored on the memory, wherein the computer accesses the input log file to determine selection of the appropriate audio segment, and wherein the computer accesses and updates the performance log file to reflect play of the audio segment.

16. The audio segment insertion system of claim 10 further comprising a switch in electrical communication with the computer, wherein the computer effects control of the switch to interrupt the translator broadcast and insert an audio segment.

17. A method for unobtrusively inserting audio segments into a translator broadcast to correspond with spot breaks in a received primary broadcast transmitted from a FM transmission chain, comprising the steps of:

inserting a sub-sonic signal into the primary broadcast at the beginning of a spot break in the primary broadcast;

detecting the sub-sonic signal in the primary broadcast when received by the translator;

transmitting the sub-sonic signal to a computer;

establishing in the computer an insert window based on real time during which time the insertion of an audio segment in the translator broadcast is permitted; and interrupting the transmission of the translator broadcast and transmitting an audio segment when the sub-sonic signal is received by the computer during the insert window.

18. The method of claim 17 further comprising the steps of:

storing audio segments and an input log file in a memory in electrical communication with the computer; and accessing the memory and retrieving an audio segment for insertion in the translator broadcast based on the input log file.

19. The method of claim 17 further comprising the steps of:

inserting the sub-sonic signal into a first audio line of the FM transmission chain;

inserting an inverted sub-sonic signal into a second audio line of the FM transmission chain;

decoding the primary broadcast into first and second audio lines;

inverting the second audio line; and summing the first and second audio lines to facilitate detection of the sub-sonic signal.

20. The method of claim 17 further comprising:

linking the computer to a studio computer to enable communication between the computer and a studio computer; and accessing and updating data in the computer through use of the studio computer.

* * * * *

UNITED STATES PATENT AND TRADEMARK OFFICE

CERTIFICATE OF CORRECTION

PATENT NO. : 6,067,479
DATED : May 23, 2000
INVENTOR(S) : Mario K. Hieb

It is certified that error appears in the above-identified patent and that said Letters Patent is hereby corrected as shown below:

On the title page, item [73] Assignee, should read:

--ACME Broadcasting, Inc. --.

Signed and Sealed this

Twenty-second Day of May, 2001

*Attest:*

NICHOLAS P. GODICI

*Attesting Officer*

*Acting Director of the United States Patent and Trademark Office*